United States Patent [19]

Forchielli

[11] 4,371,398

[45] Feb. 1, 1983

[54] POLISHES/POLISH RESTORERS

[75] Inventor: Americo L. Forchielli, Sterling Junction, Mass.

[73] Assignee: Petrolite Corporation, St. Louis, Mo.

[21] Appl. No.: 169,340

[22] Filed: Jul. 16, 1980

[51] Int. Cl.$^3$ .......................... C09G 1/04; C09G 1/16
[52] U.S. Cl. ........................................ 106/10; 106/9; 524/1
[58] Field of Search ............. 106/10, 9; 260/29.6 XA; 524/1

[56] References Cited

U.S. PATENT DOCUMENTS

| | | | |
|---|---|---|---|
| 4,055,433 | 10/1977 | Morones | 106/10 |
| 4,082,558 | 4/1978 | Nobuo | 106/10 |
| 4,127,515 | 11/1978 | MacRae et al. | 106/10 |

FOREIGN PATENT DOCUMENTS 738770 10/1955 United Kingdom .

*Primary Examiner*—John Kight, III
*Assistant Examiner*—Amelia B. Yarbrough
*Attorney, Agent, or Firm*—Sidney B. Ring; Hyman F. Glass

[57] ABSTRACT

This invention relates to the use of polyolefins as protective coatings and/or restorers, preferably applied as an emulsion.

This invention also relates to a system of floor care employing such polyolefin emulsions to maintain and/or restore floor finishes. They are particularly effective in restoring powdered floor coatings to a high gloss which is slip resistant.

19 Claims, No Drawings

POLISHES/POLISH RESTORERS

A wide variety of surface coatings such as floor polishes are commercially available. Although such polishes are more or less satisfactory, they often pose problems due to certain deficiencies. The following are examples of deficiencies present in certain floor polishes:
(1) they may be tacky
(2) they may not be water resistant
(3) they may not be sufficiently protective
(4) they may not be removable without damaging the floor
(5) they may be subject to film powdering
(6) combinations of the above.

Prior to this invention, there were no surface coatings, such as floor polishes, which not only act as floor polishes but also restore the deficiencies of polishes already on the floor.

I have now discovered a surface coating such as a floor polish which not only coats a surface such as a floor, in the manner of a polish, but also restores the surface coating or polish already on the floor, thus obviating the necessity of removing said polish.

The polish of this invention
(1) dramatically enhances the slip resistance (safety) of floor surfaces
(2) prevents and solves floor polish powdering problems
(3) provides slip resistant high gloss surfaces, particularly with high speed buffing
(4) prolongs the life of the floor surface
(5) reduces labor and maintenance costs
(6) reduces dramatically the number of times (frequency) which floors need to be cleaned and/or worn out floor finishes be removed and new floor polish applied
(7) provides resistance to the damaging effect of water, dirt, salts, de-icers, and heel marks
(8) provides easy maintenance by first sweeping floor, and then buffing to restore any areas which appear to be scuffed.

The polishes of this invention are characterized by the presence of polyolefins. These polyolefins are liquid polymeric materials that could withstand temperature extremes, are water insoluble, non-volatile at use temperatures, are capable of forming a film that is buffable to an extremely high gloss, are non-destructable to floor polishes and long-lasting. They can be incorporated into an easily usable product such as an emulsion which can be handled by anyone familiar with using floor polishes.

Polyolefin emulsions can be applied to hard surfaces (particularly floors) with ease of application and non-deleterious to a wide variety of surfaces such as are floor surfaces, sealed wood, sealed concrete, composition flooring such as asphalt tile, rubber tile, vinyl tile, vinyl asbestos tile and any other admixtures common to the flooring industry.

The invention has also been used successfully on surfaces protected by floor polishes, floor seals, varnishes, as well as on surfaces such as Terrazzo, Ceramic Tiles, which had no protective coating previously applied.

The poly(alpha-olefins) of this invention are prepared in the manner of U.S. Pat. No. 2,937,129 which is, by reference, incorporated into the present application as if part hereof.

These comprise primarily liquid alpha-olefins polymerized in the presence of a free radical catalyst at low pressure but sufficient to keep the reactants and product from vaporizing. In practice, one employs temperatures of from about 40° to 250° C. and pressures of less than about 500 psi for a period of 7 to 20 half-lives of the free radical catalyst, and a molar ratio of free radical catalyst to hydrocarbon of about 0.005 to 0.35.

Alpha-olefins which may be polymerized to obtain the polymers of this invention include alpha-olefins of the formula $RCH=CH_2$ where R is a hydrocarbon group, such as where R has 3–18 carbons, for example 5 to 15 carbons, but preferably 8 to 12 carbons. Typical alpha-olefins include those compositions where R is alkyl such as the following: hexene-1, heptene-1, octene-1, decene-1, undecene-1, dodecene-1, tetradecene-1, mixtures thereof, etc.

A typical liquid poly(alpha-olefin) is prepared according to U.S. Pat. No. 2,937,129. Specifically, dodecene-1 was polymerized according to the procedure of Example 3 of U.S. Pat. No. 2,937,129.

VYBAR ®825 which is prepared in the manner of Example 3 of U.S. Pat. No. 2,937,129 is a commercial poly(alpha-olefin) polymer of the Bareco Division of Petrolite Corporation, having the following properties.

TABLE I

| Property | Test Method | Units | VYBAR ® 825 |
| --- | --- | --- | --- |
| Pour Point | ASTM D-97 | °F.(°C.) | <−30(−34.4) |
| Viscosity | | | |
| @ 32° F. (0° C.) | ASTM D-2669 | Centipoise | 6400 |
| @ 50° F. (10° C.) | | | 2800 |
| @ 100° F. (37.8° C.) | ASTM D-3236 | | 530 |
| @ 150° F. (65.6° C.) | | | 157 |
| @ 210° F. (98.9° C.) | | | 54 |
| @ 250° F. (121° C.) | | | 31 |
| @ 300° F. (149° C.) | | | 18 |
| Density | | | |
| @ 75° F. (24° C.) | ASTM D-1168 | grams/cc | 0.86 |
| Iodine | | cg I$_2$/g | |
| Number | ASTM D-1959 | sample | 30 |
| Color | ASTM D-1500 | | 0.0 |

The polyolefin employed in these compositions is employed in emulsified form, with or without other agents. The amount of polyolefin employed in the emulsion can vary widely, from 0.5 to 35.0 % by wgt., for example from about 1 to 15%, such as from about 2 to 10%, but preferably from about 3 to 5%. In general, a sufficient amount of polyolefin is employed to achieve the desired result. Greater amounts may be employed but there is no commercial advantage in doing so.

The following are representative formulations:

TABLE II

| | Wgt. % | | | |
| --- | --- | --- | --- | --- |
| Component | Broad Range (about) | Intermediate Range (about) | Narrow Range (about) | Optimum Range (about) |
| Polyolefin | 0.5–30 | 1–15 | 2–10 | 3–5 |
| Emulsifier | 0.1–32 | 0.5–20 | 1–12 | 2–6 |
| Solvent | 0.1–33 | 1–25 | 2–15 | 3–7 |
| Leveling Agent | 0–3 | 0.1–2 | 0.2–1 | 0.3–0.7 |
| Other Agents | 0–1 | 01–0.8 | .03–0.2 | .05–0.1 |
| Water | 1–99 | 97–37 | 62–95 | 81–92 |

Any suitable emulsifier can be employed. The emulsifier should be capable of emulsifying the polyolefin in the desired concentration so that it is capable of being applied to the surface in a way to give the desired results. The chemical structure of the emulsifier is immaterial provided it forms the emulsion and achieves the desired results. Stated another way, the emulsifier should function without substantial deleterious effects.

The properly selected emulsifier may be nonionic, anionic, cationic or ampholytic. The following are representative examples of commercial emulsifiers which have been employed separately or in combination:

Ninate 411, an anionic amine alkylarylsulfonate,
Span 60, a nonionic sorbitan monostearate.
Other suitable emulsifiers can be employed.

Any suitable solvent can be employed provided it achieves the desired results without substantial deleterious effects. Solvents may include hydrocarbons such as mineral spirits, kerosene, xylenes, etc.; esters such as isobutyl isobutyrate (also a leveling agent), etc.; carbitol type solvents, Terpenol compounds such as terpene alcohols such as pine oil (also a leveling agent), etc. Pine oil is the preferred solvent for the following reasons:

(1) it has clean smell
(2) it is a solvent for the polyolefin and emulsifier
(3) it is also a leveling agent
(4) it is germicidal
(5) it is inexpensive.

By the use of a suitable solvent in the proper amounts, and in combination with a suitable emulsifier, a satisfactory emulsion can be prepared.

Any suitable optical brightener can be employed provided it performs its function without substantial deleterious effects such as Tinopal CBS which is a distyrylbiphenol derivative; 4,4' Stilbene-2,2'-disulfonic acid; coumarin derivatives such as 4-methyl-7-diethylamine coumarin, etc.

Other additives may be optionally used as colors, fragrances, etc.

This invention is more than a new product. It is a new system of floor care which is simple but different. Simple because it uses familiar and easy procedures. Different because of the new product it uses to build and keep the shine. It needs no special equipment, in fact, it eliminates some of the time-consuming procedures like stripping, monthly refinishing or daily spray-buffing that has made floor care hard work.

The heart of the system is a new and different product which is not a floor finish in the conventional sense since floor finishes generally contain acrylic polymers. This product is a polyolefin. On the floor, it produces a new look and feel by yielding a spectacular gloss and a different feel under foot because it isn't brittle like a finish. It not only stays flexible but is anti-slip. In addition, it does not powder.

The system is carried out as follows by: (1) applying a good foundation with a floor finish, (2) cleaning the floor daily or frequently, and (3) treating the floor as often as required, such as weekly, with the product of this invention. With a good foundation, a clear, shiny floor is protected with a hard-coat finish. Then the floor is cleaned regularly with a floor cleaner that helps keep the shine. For some floors this means daily cleaning, for others it will be less frequent.

To keep the floor in good condition, mop with the restorer of this invention as often as required, for example, about once a week as you would a cleaner. The restorer cleans as it is mopped on and dries to a low sheen; with a red pad in your floor polish machine it polishes to a high gloss. For the quickest job, a high speed machine is used for buffing to instantly bring the floor to a full brilliance. Any of today's high speed machines or a standard machine can also do the job but of course it will take a little longer to yield a bright buffed glossy floor.

The present system has the following advantages: (1) it all but puts an end to regular recoating with a floor finish and to the time and effort it takes to prepare the floor each time; (2) the easy use of the cleaner and restorer keeps floors as beautiful as can be for month after month with no build-up. Thus there is no need to recoat with floor finish, with the problems of trapped dirt and dulling. And any time one wants to make the floors look better between mopping, simply dry-buff the restorer with a red pad.

If there is severe traffic or problem in black marking, occasionally spray-buffing can be part of the system. When needed, it provides the extra bit of abrasion to remove any deep marks or scuffs. The restorer positively stops powdering, that peskiest of floor problems. When ordinary floor finishes start to powder, the way to remedy it immediately is to mop with a solution of restorer and then buff. The restorer itself which can't powder will stop powdering on any finish that does. The system has another advantage that's especially desirable on any floor. It is more anti-slip than any floor finish.

The restorer can be used in any kind of building or on any kind of resilient or terrazzo floor to give high gloss floors.

In summary, the composition is applied in the following manner.

The polish emulsion is uniformly applied to a substrate such as a floor, the vehicle is allowed to volatilize and when dry the residual film is mechanically buffed in seconds to an extremely high gloss.

The emulsions of this invention can be prepared by any convenient method. The following examples of emulsions of this invention useful as surface coatings and/or restorers are presented for purposes of illustration and not of limitation.

EXAMPLE 1

| | wt./gal. 8.185 lbs. | | |
|---|---|---|---|
| FORMULA | | | |
| % by weight | Material | lbs/100 gals. | lbs/1000 gals. |
| 4.00 | VYBAR ® 825 | 32.74 | 327.40 |
| 3.00 | NINATE 411 (emulsifier) | 24.55 | 245.50 |
| 4.5 | PINE OIL | 32.70 | 327.00 |
| 0.5 | ISOBUTYL ISOBUTYRATE | 4.10 | 41.00 |
| 0.01 | TINOPAL CBS (optical brightener) | 0.08* | 0.80** |
| 88.49 | WATER | 724.33 | 7243.30 |
| 100.0 | | 818.50 | 8185.00 |

*36.3 grams
**363 grams
All components except water were premixed. The water at 180° F. was incrementally added to the stirred mixture to form the emulsion. The product had the following specifications.
SPECIFICATIONS
pH: 4.0 ± 0.5
Refractive Index: 1.3380 ± 0.0004
Color: Milky white liquid
Total Solids: 7.2% ± 0.2

EXAMPLE 2

| % by weight | Material | wg./gal. 8.044 lbs. | | |
|---|---|---|---|---|
| | | | lbs/100 gals. | lbs/1000 gals. |
| 3.60 | VYBAR ® 825 | | 28.96 | 289.60 |
| 2.70 | NINATE 411 (emulsifier) | | 21.72 | 217.20 |
| 4.00 | PINE OIL | | 32.18 | 321.80 |
| 1.35 | SPAN 60 (emulsifier) | | 10.85 | 108.50 |
| 0.40 | ISOBUTYL ISOBUTYRATE | | 3.22 | 32.20 |
| 0.01 | TINOPAL CBS (optical brightener) | | 0.08* | 0.80** |
| 87.94 | WATER @ 180° F. | | 707.39 | 7073.90 |
| 100.00 | | | 804.40 | 8044.00 |

*36.3 grams
**363 grams

All components except water were premixed. The water at 180° F. was incrementally added to the stirred mixture of components to form the emulsion. The product had the following specifications.
SPECIFICATIONS
pH: 4.5 ± 0.5
Refractive Index: 1.3332 ± 0.003 (Diluted 5 grams Restorer to 15 grams water.)
Total Solids: 7.6 ± 0.3
Color: Milky white liquid More concentrated emulsions of VYBAR ®825 can also be prepared and then diluted to the desired concentrations. Concentrated emulsions may be from about 5.0 to 95.0% by wgt., such as from about 10.0 to 60.0%, for example from about 12.0 to 50.0%, but preferably from about 15 to 35%.

The following are examples of concentrated formulations.

TABLE III

| | % by Wt. | | |
|---|---|---|---|
| | Ex. A | Ex. B | Ex. C |
| VYBAR ® 825 | 27.83 | 16.0 | 31.73 |
| Ninate 411 | 13.92 | 8.0 | 23.80 |
| Pine Oil | 47.81 | 30.0 | 35.69 |
| Span 60 | 10.40 | 6.0 | — |
| Isobutyl Isobutyrate | — | — | 3.97 |
| Optical Brightener | 0.04 | — | 0.08 |
| Water | — | 40.0 | 4.73 |
| | 100.00 | 100.00 | 100.00 |

Note that A is a waterless concentrate. These concentrated formulations are diluted to the desired concentration prior to application to the surface.

The compositions of this invention are more than surface coatings (i.e., polishes). They are also surface coating restorers (i.e., polish restorers) which are capable of converting poor, degraded, or defective surface coatings already on the floor to fine buffed finishes. The following example of their use as restorers is presented for purposes of illustration and not of limitation.

WORKING EXAMPLE I

A Courthouse which is a large multiple-story structure with worn asphalt floors throughout most of the building, was routinely cleaned by a rather large contract cleaning company which had a problem since they began the contract some five months ago. At the heart of their cleaning problem was a serious powdering problem on virtually all the asphalt floors. The primary floor finish used was conventional floor polishes of the acrylic type, but regardless of the product used, extensive powdering persisted.

Because powdering was so severe the following procedures were followed in applying the composition of this invention. First, the floor was dustmopped. Secondly, the floor was lightly scrubbed with a mild floor cleaner and a red pad under a standard floor machine, following with a cool clear water rinse. Finally, two thin coats of the diluted composition of Example 1 (1 part of Ex. 1 was diluted with 5 parts of water) were applied, each coat being totally buffed when thoroughly dry with a red pad under a Hi-speed floor machine. As a final step to further enhance the gloss, the entire area was buffed with a white pad under the Hi-speed machine.

The results were outstanding. The gloss was the highest ever achieved on the floor since the contract was taken (even higher than areas which had received 4-5 coats of floor finish) and most importantly NO POWDERING occurred. The contract cleaners had thus solved their "unsolvable" powdering problem.

In summary, this invention relates to compositions characterized by the presence of polyolefins which can be formulated as a protective coating and/or restorer. In the preferred embodiment it is formulated as an emulsion. In general the emulsion, besides containing the polyolefin, also contains a suitable emulsifier and solvent. In addition, other components can also be employed such as leveling agents, optical brighteners, etc.

The polishes are characterized as emulsions of polyolefins prepared from polymerized α-olefins having alkyl group of from about 3–18 carbons, but preferably from about 8–12 carbons. Other additives may be employed in the emulsion polish.

In practice, polyolefin emulsions are prepared such as in Examples 1 and 2 in concentrations of about 3–5%. The user dilutes 1 part of this 3–5% emulsion with about 5 parts of water so that the concentration of use is less than 1% polyolefin, such as from about 0.1 to 1% polyolefin. This diluted solution is applied to the surface such as a floor and allowed to dry. When dry, the coating is buffed to a high gloss.

The restorer formulation is applied to a base polish already on the surface such as an acrylic polish. Repeated applications and buffing of the restorer on the base polish continuously restores the base polish to a high gloss that keeps the base polish eternally new. The polished surface is also relatively slip-resistant.

This invention also relates to a system of floor care involving surface coatings which are useful not only as polishes but also as polish restorers. They very effectively and economically maintain floors by restoring them to a high gloss with enhanced slip resistance. They are particularly effective in preventing and restoring powdered floor coatings.

As is quite evident, a wide variety of compositions employed herein such as emulsifiers, solvents, leveling agents, optical brighteners and other additives, can be used in this invention. It is, therefore, not only impossible to attempt a comprehensive catalogue of such compositions, but to attempt to describe the invention in its broadest aspects in terms of specific chemical names for such compositions would be too voluminous and unnecessary since one skilled in the art could by following the description of the invention herein prepare an appropriate polyolefin emulsion. This invention encompasses polyolefin emulsions useful as surface coating and/or restorers and the individual components of such compositions are important only in the sense that they affect this function. To precisely define each specific composition employed in light of the present disclosure would merely call for chemical knowledge within the skill of the art in a manner analogous to a mechanical engineer who prescribes in the construction of a machine the proper materials and the proper dimensions thereof. From the decription in this specification and with chemical knowledge, one will know or deduce with confidence the applicability of compositions suitable for this invention. In analogy to the case of a machine, wherein the use of certain materials of construction or dimensions of parts would lead to no practical useful result, various materials will be rejected as inapplicable where others would be operative. One can obviously assume that no one will wish to prepare a useless polyolefin emulsion nor will be misled because it is possible to misapply the teachings of the present disclosure to do so. Thus, any polyolefin emulsion which can perform the function stated herein can be employed.

I claim:

1. A composition of matter useful as a protective coating and coating restorer comprising: (1) a liquid water-insoluble polyolefin formed by polymerizing alpha-olefins of the formula $RCH=CH_2$ where R is a hydrocarbon group, (2) an emulsifier for said polyolefin, (3) a solvent which can also be a leveling agent, and (4) water.

2. The composition of claim 1 wherein R contains 3 to 18 carbon atoms.

3. The composition of claim 2 wherein R contains 5 to 15 carbon atoms.

4. The composition of claim 3 wherein R contains 8 to 12 carbon atoms.

5. The composition of claim 1 wherein said polyolefin is hexene-1.

6. The composition of claim 1 wherein said polyolefin is heptene-1.

7. The composition of claim 1 wherein said polyolefin is octene-1.

8. The composition of claim 1 wherein said polyolefin is decene-1.

9. The composition of claim 1 wherein said polyolefin is undecene-1.

10. The composition of claim 1 wherein said polyolefin is dodecene-1.

11. The composition of claim 1 wherein said polyolefin is tetradecene-1.

12. The composition of claim 1 wherein said emulsifier is selected from the group consisting of an anionic amine alkylarylsulfonate, a nonionic sorbitan monostearate and mixtures thereof.

13. The composition of claim 12 wherein said solvent is selected from the group consisting of mineral spirits, kerosene, xylene, isobutylisobutyrate, carbitols and terpene alcohols.

14. The composition of claim 13 which additionally includes (5) optical brighteners.

15. The composition of claim 14 which comprises by weight %: 3–5 polyolefin, 2–6 emulsifier, 3–7 solvent, 0.3–0.7 leveling agent, 0.5–0.1 other agents and 81–92 water.

16. The composition of claim 15 wherein said polyolefin is polymerized dodecene-1.

17. The composition of claim 16 wherein said emulsifier is a mixture of an anionic amine alkylarylsulfonate and a nonionic sorbitan monostearate.

18. The composition of claim 17 wherein said solvent is pine oil.

19. A process of treating surfaces which comprises treating such surfaces with the composition of claim 18.

* * * * *